US010253727B2

(12) United States Patent
Pretty et al.

(10) Patent No.: US 10,253,727 B2
(45) Date of Patent: Apr. 9, 2019

(54) BACKSIDE ACOUSTIC TREATMENT OF NACELLE STRUCTURAL FITTINGS

(71) Applicant: Rohr Inc., Chula Vista, CA (US)

(72) Inventors: Michael Sean Pretty, Jamul, CA (US); Kristopher B. Shaner, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 342 days.

(21) Appl. No.: 15/153,107

(22) Filed: May 12, 2016

(65) Prior Publication Data

US 2017/0328281 A1    Nov. 16, 2017

(51) Int. Cl.
*F02K 1/82* (2006.01)
*F02C 7/24* (2006.01)
*B64D 29/06* (2006.01)
*F02K 1/72* (2006.01)

(52) U.S. Cl.
CPC .............. *F02K 1/72* (2013.01); *B64D 29/06* (2013.01); *F02K 1/827* (2013.01); *F05D 2230/60* (2013.01); *F05D 2260/963* (2013.01); *F05D 2300/603* (2013.01); *Y02T 50/672* (2013.01)

(58) Field of Classification Search
CPC .............. F02C 7/24; B64D 29/06; F02K 1/72
USPC ................................................. 181/213, 292
See application file for complete search history.

(56) References Cited

U.S. PATENT DOCUMENTS

| | | | | |
|---|---|---|---|---|
| 3,819,007 | A * | 6/1974 | Wirt | E04B 1/86 181/286 |
| 3,887,031 | A * | 6/1975 | Wirt | E04B 1/86 181/286 |
| 4,751,979 | A * | 6/1988 | Wiseman | F02C 7/24 181/213 |
| 8,685,302 | B2 | 4/2014 | Kowal et al. | |
| 8,944,753 | B2 | 2/2015 | Bouchard et al. | |
| 8,955,643 | B2 * | 2/2015 | Liu | F02C 7/045 181/213 |
| 9,016,042 | B2 * | 4/2015 | Chiou | F02K 1/60 137/15.1 |
| 2011/0219782 | A1 | 9/2011 | Clemen | |
| 2013/0142624 | A1 * | 6/2013 | Julliard | B64D 33/06 415/119 |
| 2013/0161415 | A1 * | 6/2013 | Bellanger | F02K 1/72 239/265.19 |
| 2015/0041059 | A1 * | 2/2015 | Olson | F02K 1/56 156/308.6 |

(Continued)

*Primary Examiner* — Jeremy A Luks
(74) *Attorney, Agent, or Firm* — Cantor Colburn LLP

(57) ABSTRACT

Acoustically treated components and methods of acoustic treating are provided. The acoustically treated components include a structural fitting having a first surface and a second surface, wherein the first surface defines a flow path and includes a plurality of perforations passing through the structural fitting from the first surface to the second surface, at least one non-structural acoustic treatment member installed on the second surface, a first end of the at least one non-structural acoustic treatment member attached to the second surface such that a cellular structure of the at least one non-structural acoustic treatment member aligns with the plurality of perforations, and a cover attached on a second end of the at least one non-structural acoustic treatment member such that an acoustic chamber is defined between the cover and the cellular structure and open to the flow path.

14 Claims, 5 Drawing Sheets

(56) References Cited

U.S. PATENT DOCUMENTS

| | | | | |
|---|---|---|---|---|
| 2015/0108250 A1* | 4/2015 | Aten | ................... | B64D 29/06 239/265.19 |
| 2015/0110603 A1* | 4/2015 | Biset | ................... | F02C 7/045 415/119 |
| 2016/0017775 A1* | 1/2016 | Mattia | ................... | F02K 1/827 181/213 |

* cited by examiner

BACKSIDE ACOUSTIC TREATMENT OF NACELLE STRUCTURAL FITTINGS

BACKGROUND

The subject matter disclosed herein generally relates to acoustic treatments and, more particularly, to acoustic treatment of structural fittings, such as hinge and latch beams, in aircraft engine nacelles.

Commercial jet aircraft typically include turbofan propulsion systems comprising a turbofan engine housed in a nacelle. The major components of a nacelle may include an inlet, a fan cowl, a thrust reverser, and an exhaust assembly. Among other functions, the nacelle provides aerodynamic fairings that surround the propulsion system to reduce drag and provides a nozzle for the core from the engine and the bypass air from the fan. The thrust reverser produces reverse thrust to slow the aircraft upon landing. The inlet, thrust reverser, and exhaust assembly may also include acoustic treatments to help attenuate noise generated by the engine. For example, the thrust reverser, which helps define the duct for the fan bypass air, may be constructed in part with acoustic sandwich panels that attenuate noise emanating from the fan. Much of the internal surface of the bypass duct formed by the thrust reverser is formed with these acoustic panels to help significantly reduce the noise. However, a portion of the duct inner surface in a typical modern thrust reverser remains acoustically untreated. Adding acoustic treatments to the presently untreated surfaces is an opportunity to further reduce aircraft engine noise.

The acoustically untreated surfaces today inside a thrust reverser bypass duct include surfaces formed by the twelve o'clock and six o'clock hinge and latch beams, and surfaces surrounding bleed air exhaust ports, and air-cooled oil cooler cooling air scoops. These structures are not made with sandwich panels, so applying acoustic treatments to them has been more difficult. The present disclosure offers an option for applying acoustic treatments to hinge and latch beams and similar structures or fittings that make up part of the air flow surfaces on a nacelle.

SUMMARY

According to one embodiment, an acoustically treated component is provided. The acoustically treated component includes a structural fitting having a first surface and a second surface, wherein the first surface defines a flow path and includes a plurality of perforations passing through the structural fitting from the first surface to the second surface, at least one non-structural acoustic treatment member installed on the second surface, a first end of the at least one non-structural acoustic treatment member attached to the second surface such that a cellular structure of the at least one non-structural acoustic treatment member aligns with the plurality of perforations, and a cover attached on a second end of the at least one non-structural acoustic treatment member such that an acoustic chamber is defined between the cover and the cellular structure and open to the flow path.

According to another embodiment, the acoustically treated component includes a structural fitting having a first surface and a second surface, wherein the first surface defines a flow path and includes a plurality of perforations passing through the structural fitting from the first surface to the second surface; a first structural rib extending from the second surface; a second structural rib extending from the second surface, wherein a pocket is defined between the first structural rib and the second structural rib; at least one non-structural acoustic treatment member installed within the pocket, a first end of the at least one non-structural acoustic treatment member attached to the second surface such that a cellular structure of the at least one non-structural acoustic treatment member aligns with the plurality of perforations; and a cover attached on a second end of the at least one non-structural acoustic treatment member such that an acoustic chamber is defined between the cover and the cellular structure and open to the flow path.

In addition to one or more of the features described above, or as an alternative, further embodiments of the acoustically treated component may include that the structural fitting is one of cast, machined, or additively manufactured.

In addition to one or more of the features described above, or as an alternative, further embodiments of the acoustically treated component may include that the structural fitting is a component of a thrust reverser of a gas turbine engine.

In addition to one or more of the features described above, or as an alternative, further embodiments of the acoustically treated component may include that the at least one non-structural acoustic treatment member is attached to the structural fitting by one of bonding or mechanical attachment.

In addition to one or more of the features described above, or as an alternative, further embodiments of the acoustically treated component may include that the cover is attached to the at least one non-structural acoustic treatment member by one of bonding or mechanical attachment.

In addition to one or more of the features described above, or as an alternative, further embodiments of the acoustically treated component may include that the structural fitting has at least two pockets and each pocket is installed with a respective non-structural acoustic treatment member, and wherein the cover is attached over both non-structural acoustic treatment members.

According to one embodiment, a method of providing acoustic treatment to a structural fitting is provided. The method includes installing a first end of at least one non-structural acoustic treatment member to a structural fitting, the at least one non-structural acoustic treatment member having a cellular structure, and the structural fitting having a first surface defining a flow path and a second surface opposing the first surface, the second surface having structural ribs extending therefrom and defining at least one pocket formed between the structural ribs; forming perforations in the structural fitting, the perforations extending through the structural fitting from the first surface to the second surface, the perforations formed to be in communication with the cellular structure when the at least one non-structural acoustic treatment member is installed to the structural fitting; and installing a cover on a second end of the at least one non-structural acoustic treatment member such that an acoustic chamber is defined between the cover and the cellular structure and open to the flow path.

In addition to one or more of the features described above, or as an alternative, further embodiments of the method may include that the perforations are formed prior to installing the at least one non-structural acoustic treatment member in the at least one pocket of the structural fitting.

In addition to one or more of the features described above, or as an alternative, further embodiments of the method may include that the structural fitting is one of cast, machined, or additively manufactured.

In addition to one or more of the features described above, or as an alternative, further embodiments of the method may include that the structural fitting is a component of a thrust reverser of a gas turbine engine.

In addition to one or more of the features described above, or as an alternative, further embodiments of the method may include that the perforations are formed by multi-hole drilling.

In addition to one or more of the features described above, or as an alternative, further embodiments of the method may include that the installation of the at least one non-structural acoustic treatment member to the structural fitting comprises one of bonding or mechanical attachment.

In addition to one or more of the features described above, or as an alternative, further embodiments of the method may include that installation of the cover to the at least one non-structural acoustic treatment member comprises one of bonding or mechanical attachment.

In addition to one or more of the features described above, or as an alternative, further embodiments of the method may include manufacturing the structural fitting by one of casting, machining, or additive manufacturing.

In addition to one or more of the features described above, or as an alternative, further embodiments of the method may include that the structural fitting has at least two pockets and each pocket is installed with a respective non-structural acoustic treatment member, and wherein the cover is installed over both non-structural acoustic treatment members.

Technical effects of embodiments of the present disclosure include non-structural acoustic treatments that can be applied to components or features of an engine that are not normally acoustically treated. Further technical effects include applying non-structural acoustic treatment members to structural fittings that are not normally treated, thus improving and/or increasing the amount of acoustic treatment within a gas turbine engine.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1A:
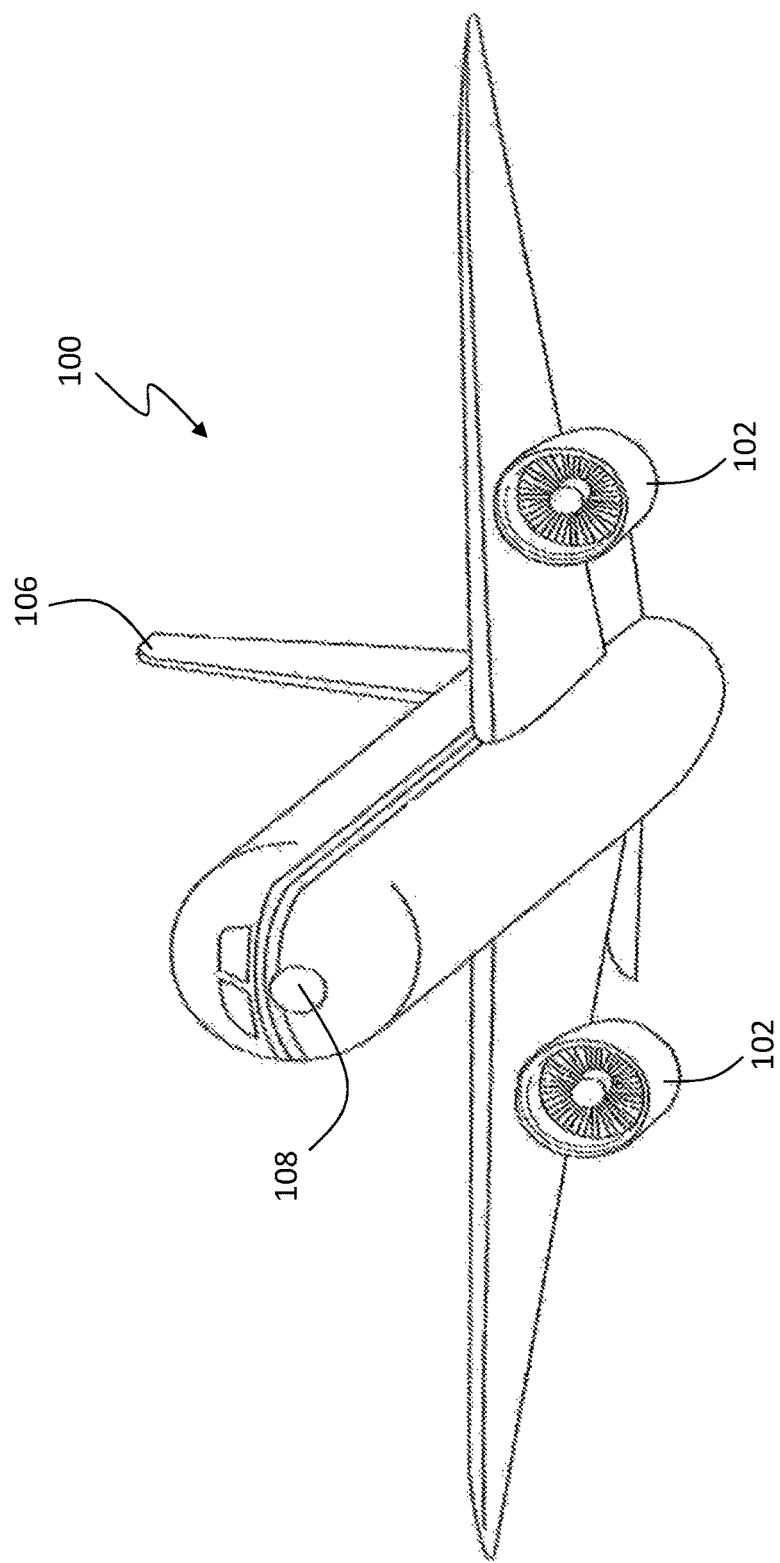
FIG. 1A is a schematic illustration of an aircraft having propulsion systems that may employ embodiments of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Figure 1C:
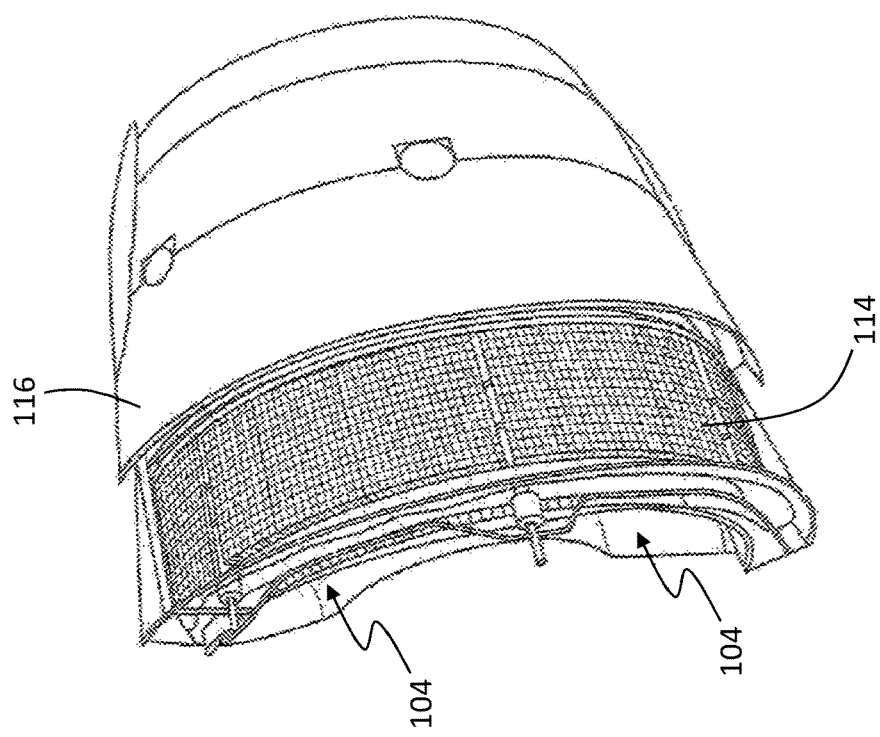
FIG. 1C is a schematic illustration of the thrust reverser half of FIG. 1B, the view in FIG. 1C showing the external surface of the thrust reverser (visible from outside the aircraft when installed) and showing the translating sleeve in its deployed position to expose the cascades.
Figure 1B:
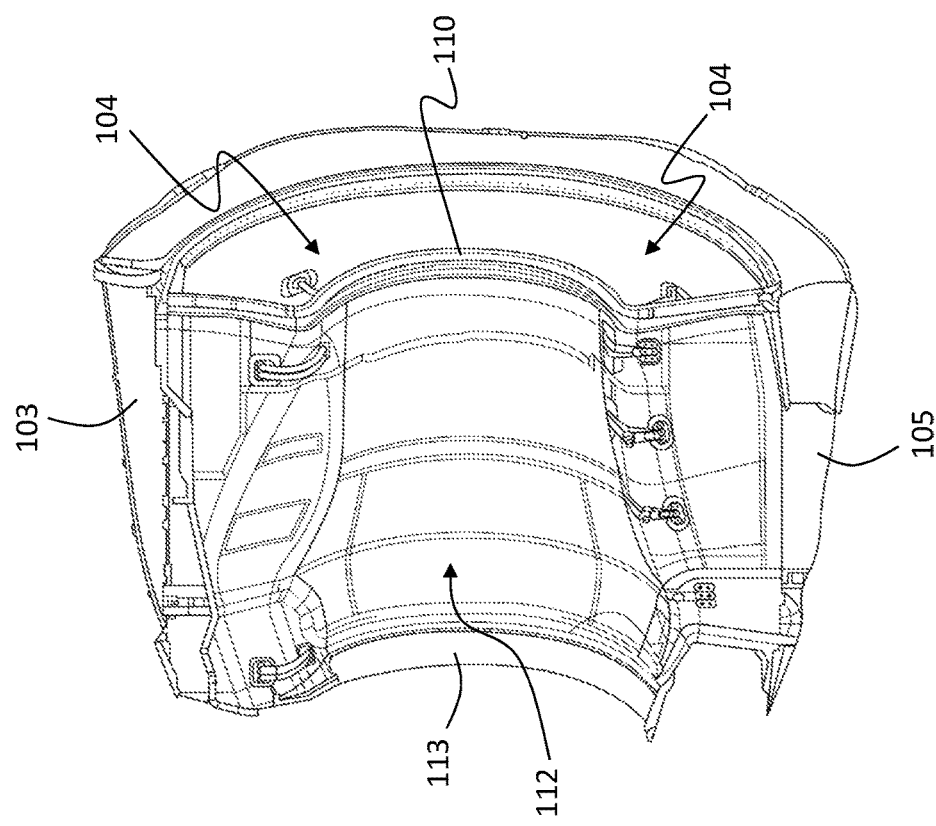
FIG. 1B is an interior schematic illustration of one side of a typical modern translating sleeve, cascade style thrust reverser that may employ embodiments of the present disclosure, the view in FIG. 1B showing the portion of the thrust reverser that faces the engine, while also showing a view of the inlet to the portion of the bypass duct formed by the thrust reverser.

With reference to FIGS. 1A-1C, an aircraft 100 includes propulsion systems 102, each comprising a turbofan engine surrounded and housed by various nacelle components or structures. The nacelle for propulsion systems 102 typically include a thrust reversing structure or assembly (e.g., as shown in FIGS. 1B-1C). The nacelle surrounds and houses the turbine(s), combustor(s), compressor(s), etc. that are part of the engines. The thrust reversing structure or assembly forms a duct 104, as shown in FIGS. 1B-1C, for the bypass air from the fan, as will be understood by those of ordinary skill in this art. The bypass duct 104 is a traditional "C"-shaped duct in the illustrated embodiment because it is formed by two clam-shell thrust reverser halves. Other duct configurations, such as an O-duct, are possible, and the concepts and/or embodiments provided here can apply to these other thrust reverser configurations in a similar manner.

As used herein, "aft" refers to the direction associated with a tail 106 (e.g., the back end) of the aircraft 100, or generally, to the direction of exhaust of engines 102. As used herein, "forward" refers to the directed associated with a nose 108 (e.g., the front end) of the aircraft 100, or generally, to a direction of flight or motion.

The thrust reverser half, as shown in FIG. 1B, has an inner fixed structure (IFS) 110 with an inner surface 112. The inner surface 112, along with a similar inner surface on the other thrust reverser half, helps define an engine compartment surrounding a portion of the gas turbine engine. At the aft end a core cowl 113 may be attached to the IFS 110. Attached to the top of the IFS 110 is a hinge beam 103 and to the bottom of the IFS is a latch beam 105.

FIG. 1C shows the side of the thrust reverser half that is opposite of that shown in FIG. 1B, with the translating sleeve 116 in its deployed position to expose the cascades 114. The cascades 114 comprise a plurality of vents that redirect airflow during certain operations (e.g., landing) to generate reverse thrust. The translating sleeve 116 comprises a tapering generally cylindrical and/or partially (e.g., semi-cylindrical) structure. The translating sleeve 116 may be disposed about the cascades 114 in a stowed position. The translating sleeve 116 may translate from a forward position to a more aft position during deployment (i.e., engagement of the thrust reverser) to expose the cascades 114. Thus, during flight, cascades 114 may be stowed or enclosed within a translating sleeve 116 to prevent reverse thrust. During landing, however, the translating sleeve 116 may translate aft to expose the cascades 114.

The translating sleeve 116 may be mounted on one or more tracks formed on the hinge beam 103 and the latch beam 105. The translating sleeve 116 may include sliders that are engaged in the tracks in a known manner so that the translating sleeve 116 is supported for translating movement relative to the beams 103, 105 (and the rest of the thrust reverser) in a direction generally parallel with the engine rotational axis.

Noise generated by the engine is attenuated by the nacelle—noise attenuation is an important factor in the design of the nacelle. For example, an interior surface of the duct 104 is formed primarily using acoustic sandwich panels that attenuate noise generated by the fan and emanating aft through the duct. These acoustic sandwich panels typically comprise a perforated top skin and a back skin, with an acoustic core sandwiched between. The perforated top skin forms the surface of the duct 104 and allows sound waves to pass into the core. The core, along with the solid back skin and the perforated top skin, forms resonating chambers that emit a destructively interfering wave out from the top skin and into the duct to mitigate the sound waves in a manner understood by those of ordinary skill in this art. Today, these acoustic sandwich panels are typically formed with a top skin and back skin made from laminate layers of fiber reinforced composite material, but in the past the skins were formed from metal sheets. Most of the surface of the duct 104 is defined by the outer surface of the IFS (opposite inner surface 112), the inner surface of the translating sleeve 116, the blocker doors (not shown), and surfaces that are part of the hinge beam 103 and latch beam 105, with the core cowl 113 and various other fittings and structures making up the balance. The majority of the outer surface of the IFS 110, the inner surface of the translating sleeve 116, and the blocker doors is typically made from acoustic sandwich panels.

Although acoustic sandwich panels make up a large portion of the surface of the ducts 104, there are portions that remain acoustically untreated. For example, the surfaces of the duct 104 defined by the hinge beam 103 and latch beam 105 are not acoustically treated today. These structures are not sandwich panels, so they don't lend themselves to incorporating acoustic treatments in the same way. Likewise, small portions of the duct defined by surfaces surrounding other structural fittings such as bleed air outlets, cooling air scoops, etc., are also not sandwich panels and thus are not acoustically treated in the traditional way. The methods described below allow for acoustically treating structural fittings in a simple and economical fashion to further attenuate the noise of an engine. As used herein "structural fittings" mean structures such as the hinge beam, latch beam, cooling air scoops, bleed air ports, and other similar metallic structures that form an airflow surface for air entering or leaving the engine. These "structural fittings" are typically characterized by their manufacturing process which is usually a casting or forging process to form thick section preforms, then machining to define their final shape. "Structural fittings" are not parts made from sheet metal.

Figure 2:
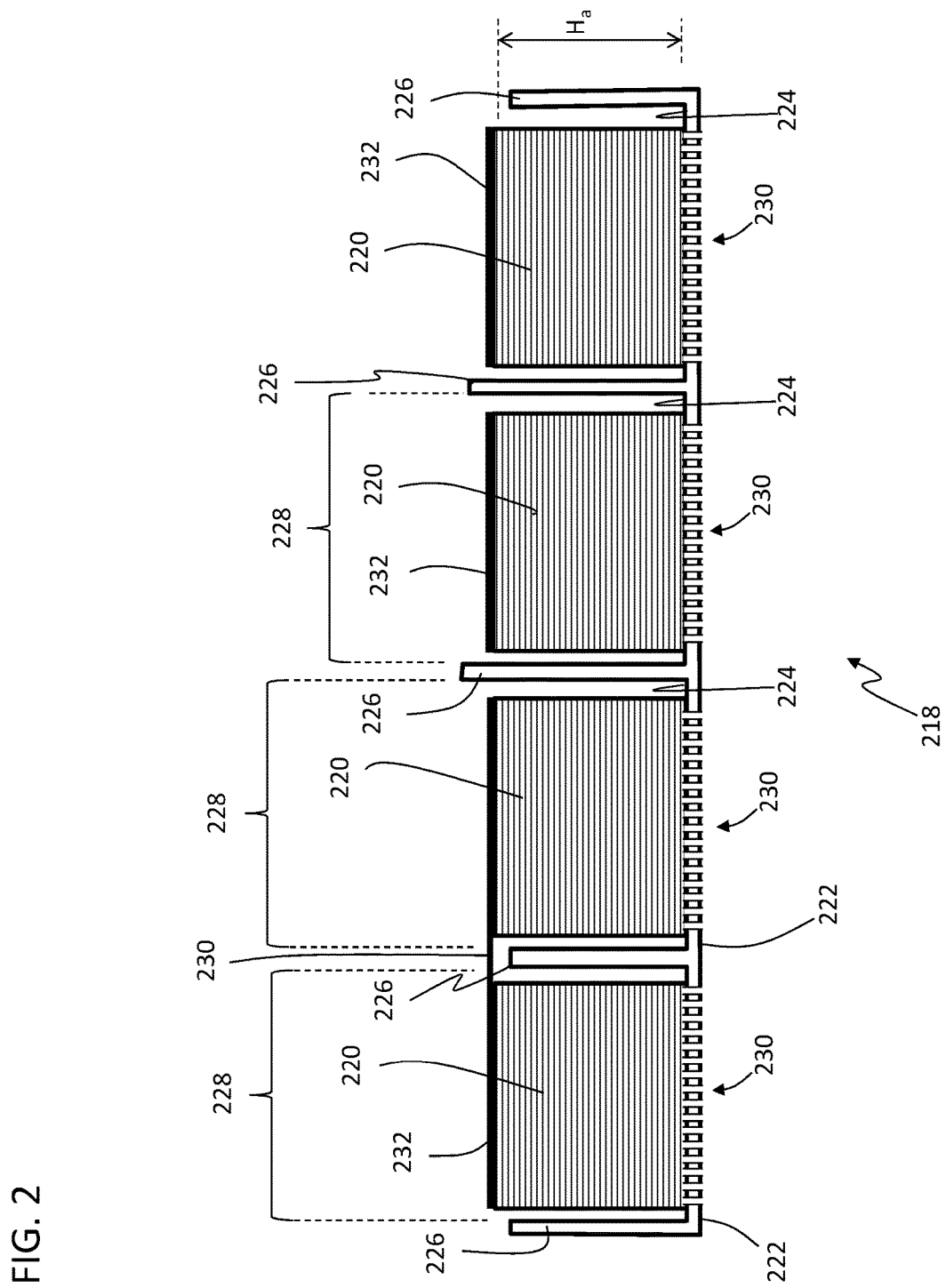
FIG. 2 is a schematic sectional illustration of a structural fitting having acoustic treatment in accordance with an embodiment of the present disclosure.

For example, referring now to FIG. 2, a schematic illustration is shown of a sectioned portion of a hinge beam or latch beam as one example of a structural fitting 218. A plurality of acoustic treatment members 220 are installed thereon. The structural fitting 218 includes a front side or first surface 222 and a back side or second surface 224 opposite the first surface 222. The first surface 222 is an aerodynamic air flow surface along which air may pass, e.g., within duct 104. The second surface 224 can define a non-flow side of the structural fitting 218. The acoustic treatment members 220 are joined to the back side or second surface 224. The acoustic treatment members 220 may be non-structural members. That is, the non-structural acoustic treatment members 220 may not and need not provide incremental structural capability to the structural fitting 218 to which they are installed. Accordingly, those of skill in the art will appreciate that the non-structural acoustic treatment members 220 can be considered parasitic in that they only add weight and acoustic properties, but do not provide structural capabilities to a fitting on which they are installed.

The structural fitting 218 includes one or more structural ribs 226 that extend from the second surface 224. The structural ribs 226 can be configured to provide rigidity, strength, support, etc. to the structural fitting 218, and in some embodiments may be configured to enable attachment of the structural fitting 218 to another component, e.g., hinge points to attach the hinge beam to the pylon. As shown, the structural ribs 226 may have different heights or lengths according to the stress created by loads acting on the structural fitting 218 or other structural requirements and/or design factors.

Two adjacent structural ribs 226 define pockets 228 between them. The pockets 228 can be voids that are provided to reduce the weight of the structural fitting 218 while maintaining the structural capability. Each pocket 228 may be bounded by adjacent structural ribs 226 and a third side is bounded by the second surface 224 of the structural fitting 218. The fourth side is open and allows installation of the non-structural acoustic treatment members 220 to the second surface 224 of the structural fitting 218.

As shown, located between the structural ribs 226 are non-structural acoustic treatment members 220. The non-structural acoustic treatment members 220 can be cellular cores configured to create resonating cells on the backside of the structural fitting 218. In some embodiments, a first end of the non-structural acoustic treatment members 220 are bonded to the second surface 224 of the structural fitting 218, or they may also be mechanically attached thereto, or integrally formed therewith. Further, in some embodiments, the bonding/attachment between the non-structural acoustic treatment members 220 and the second surface 224 of the structural fitting 218 can be non-structural, e.g., may not require structural certification and/or testing or any specific requirement regarding load transfer or structural strength, except that it be adequate to hold the acoustic treatment members 220 in position. In some embodiments, the non-structural acoustic treatment members 220 can be formed of a metal material, such as aluminum, although other materials such as composites or plastics can be used. One option is to form the non-structural acoustic treatment members 220 from injection molded plastic. The non-structural acoustical treatment members 220 form a plurality of cells, similar to the cells formed by the core in acoustic sandwich panels, which are open at both ends towards the second surface 224 and also in the opposite direction. The cells may be hexagonal (e.g., honeycomb) in cross-sectional shape, but other shapes are possible such as triangular, square, etc.

The non-structural acoustic treatment members 220 are in communication with an air flow, through the structural fitting 218, by a plurality of perforations 230. The perforations 230 are configured to enable acoustic waves to pass through the structural fitting 218 and into the non-structural acoustic treatment members 220. In some embodiments, the perforations 230 are formed and sized in a manner similar to the perforations formed on acoustic sandwich panels, e.g. with perforation diameters on the order of 0.005 to 0.080 inches (0.013 to 0.203 cm), and percent open areas (POAs) of between 1-50%. The thickness of the structural fitting between first surface 222 and the second surface 224 where the perforations are formed must not be too thick, otherwise the acoustic attenuation performance may suffer. Generally, this method is applied to portions of the structural fitting with a thickness not more than around 0.250 of an inch (0.635 cm), although greater thicknesses might be successfully treated if adjustments can be made to the cell sizes or other adjustments to maintain the acoustic performance. Perforations 230 formed through the structural fitting 218 will need to be accounted for in designing the structural fitting to withstand the loads imposed on it, but we believe that the overall mass and dimensions of most structural fittings will not change much after adding the perforations 230 and making necessary adjustments to skin and section thicknesses.

A non-perforated cover 232 is configured on the non-structural acoustic treatment members 220 opposite from the joining of the non-structural acoustic treatment members 220 to the second surface 224 of the structural fitting. That is, the cover 232 is installed on a second end of the non-structural acoustic treatment members 220. The cover 232 is used to close the cells of the non-structural acoustic treatment members 220 and thus define an acoustic chamber within the non-structural acoustic treatment members 220. The cover 232 can be bonded, mechanically attached to, or integrally formed with the non-structural acoustic treatment members 220. The cover 232, in some embodiments, is a non-structural skin or layer, and can be formed of metal, composites, plastics, and/or other materials.

The non-structural acoustic treatment members 220, because they are non-structural, can be configured to be optimized for acoustic properties rather than being limited by structural requirements. Accordingly, a height $H_a$ of the non-structural acoustic treatment members 220 and the cell dimensions can be selected for optimum acoustic properties. For example, the height $H_a$ of the non-structural acoustic treatment members 220 can be selected to match the acoustic resonance of the cells with the frequency of the noise generated by an aircraft engine.

As shown, the covers 232 can be of varying sizes (widths). For example, on the left side of FIG. 2, a cover 232 is configured to span across two non-structural acoustic treatment members 220. However, on the right side of FIG. 2, each acoustic treatment member 220 has a single cover 232. Those of skill in the art will appreciate that the covers 232 can be configured to span any number of non-structural acoustic treatment members 220.

Figure 3:
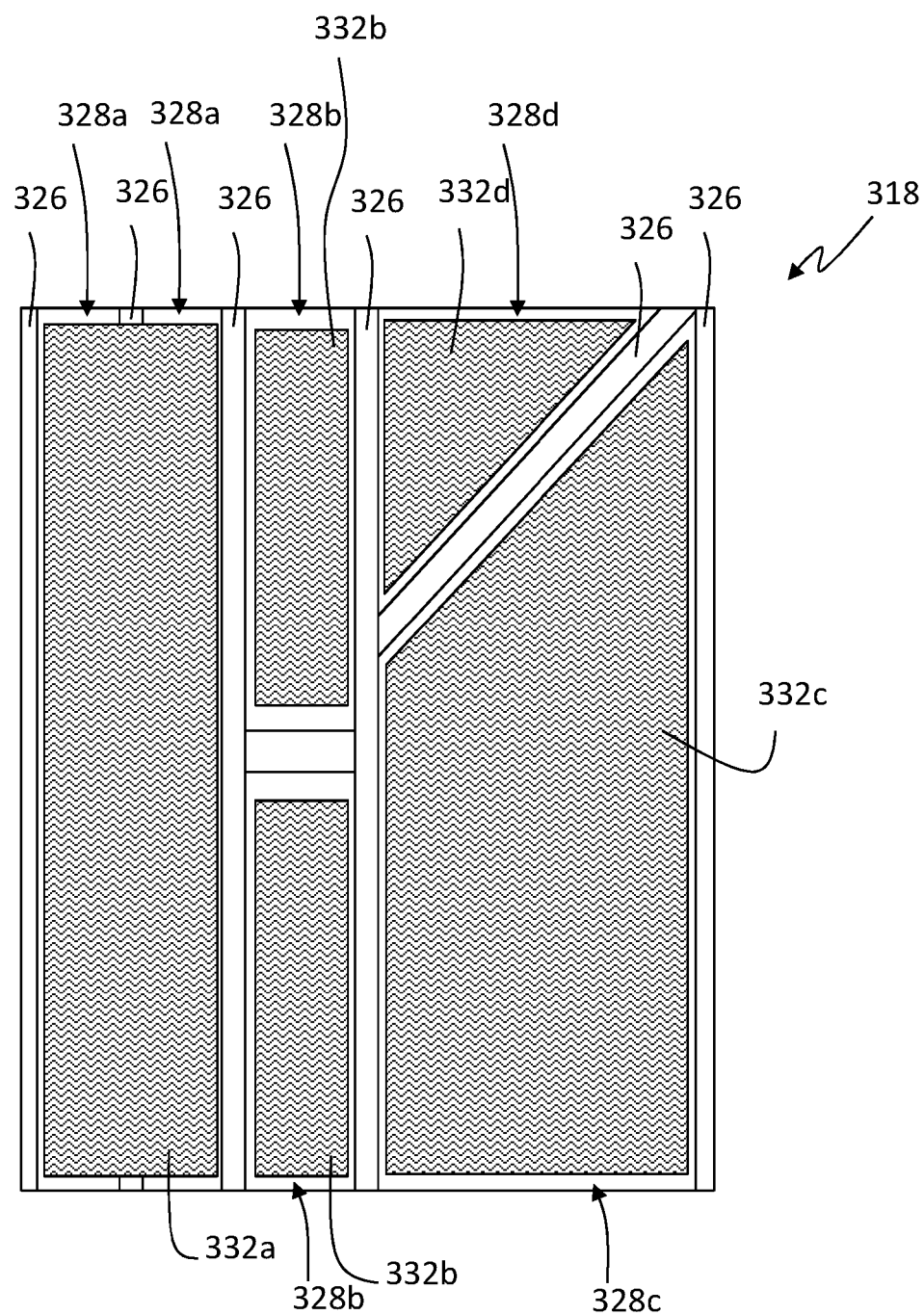
FIG. 3 is a schematic plan illustration of a structural fitting having acoustic treatment in accordance with an embodiment of the present disclosure.

For example, with reference to FIG. 3, various examples of the shapes of covers (and non-structural acoustic treatment members) in accordance with the present disclosure are shown. As shown in FIG. 3, a structural fitting 318 includes a plurality of structural ribs 326 forming various geometric shapes there between. For example, first pockets 328a are formed as parallel pockets with rectangular shapes extending from one end of the structural fitting 318 to another.

A second pocket 328b formed of two sub-pockets that are divided by a cross-rib, with each sub-pocket of second pocket 328b having a rectangular shape. A third pocket 328c has a polygonal shape, in this case a trapezoid shape. A fourth pocket 328d has a triangular shape. As shown, each pocket 328a, 328b, 328c, 328d is covered by a respective cover 332a, 332b, 332c, 332d, having a shape that is substantially the same as the respective pocket 328a, 328b, 328c, 328d. Located between each cover 332a, 332b, 332c, 332d and a second (interior) surface of the structural fitting is a non-structural acoustic treatment member of similar shape and dimension. As will be appreciated by those of skill in the art, any shape, size, and/or dimension pocket can be fitted with a non-structural acoustic treatment member and a respective cover, and thus the particular pockets, covers, and non-structural acoustic treatment members shown herein are not intended to be limiting. Further, it is noted that first cover 332a covers two adjacent pockets 328a. In such a configuration, the structural rib 326 between the two pockets 328a has a shorter height or depth than the non-structural acoustic treatment members and the covering cover 332a.

In addition to various geometric shapes for the pockets, as discussed above, those of skill in the art will appreciate that structural fittings that employ acoustic treatments described herein may take various different configurations, shapes, etc. For example, although shown with a structural fitting that is substantially a flat panel, those of skill in the art will appreciate that acoustic treatments as provided herein can be applied to curved panels, double curved panels, and/or applied to other surfaces and/or structures having various geometric shapes, sizes, dimensions, configurations, etc.

Figure 4:
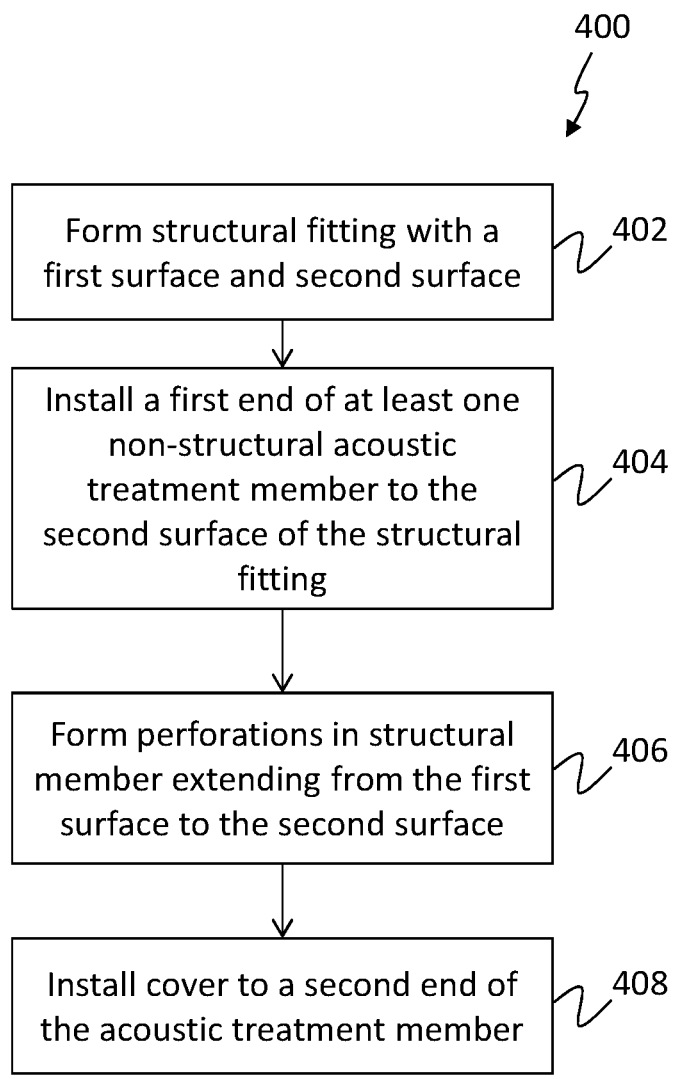
FIG. 4 is a flow process for manufacturing a component having acoustic treatment in accordance with an embodiment of the present disclosure.

Turning now to FIG. 4, a flow process for manufacturing a component in accordance with an embodiment of the present disclosure is shown. The flow process 400 can be used to manufacture an acoustically treated structural fitting for an aircraft nacelle component, such as a thrust reverser.

At block 402, a structural fitting is formed. The structural member is formed with a first surface and a second surface. The first surface is contoured and made to form a portion of fluid flow path. That is, the first surface is manufactured to form a sidewall or other surface of a fluid flow path through an engine, such as a bypass air duct. The second surface of the structural fitting may be formed with at least one structural rib that extends from the second die. The structural rib is a structural feature that may enable a connection to another component and/or may be configured for structural integrity, stress support, rigidity, etc. of the structural fitting. The formation of the structural member at block 402 is typically done by casting, forging, and/or additive manufacturing processes, followed by machining to the final shape and dimensions.

At block 404, at least one non-structural acoustic treatment member is installed to the second surface of the structural fitting. The non-structural acoustic treatment member can be a cellular core structure (e.g., honeycomb) with openings to the cellular structure extending from a first end to a second end of the core. The installation of the non-structural acoustic treatment member may be made such that the non-structural acoustic treatment member is positioned between and/or next to the structural ribs that extend from the second surface of the structural fitting. The installation of the non-structural acoustic treatment member can be by bonding, mechanical attachment, and/or integrally forming.

At block 406, perforations are formed in the structural member, which extend from the first surface through to the second surface. In some embodiments, a drilling operation can be performed, such as a multi-drilling or gang drilling, to drill holes from the first surface through to the second surface. The perforations are thus formed on a surface of the flow path and enable acoustic energy to pass through the structural fitting and into the cellular structure of the non-structural acoustic treatment member.

At block 408, a cover is installed to a second end of the non-structural acoustic treatment member. The cover is configured to form an acoustic chamber within the non-structural acoustic treatment member when the cover is applied thereto. Accordingly, with the cover installed, the acoustic chamber is defined by the cellular structures that are bounded at one end by the cover and at the other end are open to the airflow path through the perforations formed in the structural fitting.

Although flow process 400 is shown in a particular order, the particular order is not intended to be limiting, and other steps or processes can be carried out without departing from the scope of the present disclosure. For instance, the perforation of the structural member (block 406) can be accomplished prior to installing the non-structural acoustic member to the structural fitting (block 404). Further, the cover can be attached to the second end of the non-structural acoustic treatment members (block 408) prior to installing the non-structural acoustic treatment members onto the structural fitting (block 404).

Advantageously, embodiments described herein provide acoustic treatment of structural fittings that are not traditionally acoustically treated. That is, the amount of acoustic treatment within a nacelle can be increased without substantially increasing the total weight of the system.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

We claim:

1. An acoustically treated component comprising:
   a structural fitting having a first surface and a second surface, wherein the first surface defines a flow path and includes a plurality of perforations passing through the structural fitting from the first surface to the second surface;
   at least one non-structural acoustic treatment member installed on the second surface, a first end of the at least one non-structural acoustic treatment member attached to the second surface such that a cellular structure of the at least one non-structural acoustic treatment member aligns with the plurality of perforations; and
   a cover attached on a second end of the at least one non-structural acoustic treatment member such that an acoustic chamber is defined between the cover and the cellular structure and open to the flow path.

2. The acoustically treated component of claim 1, wherein the structural fitting is one of cast, machined, or additively manufactured.

3. The acoustically treated component of claim 1, wherein the structural fitting is a component of a thrust reverser of a propulsion system.

4. The acoustically treated component of claim 1, wherein the at least one non-structural acoustic treatment member is attached to the structural fitting by one of bonding or mechanical attachment.

5. The acoustically treated component of claim 1, wherein the cover is attached to the at least one non-structural acoustic treatment member by one of bonding or mechanical attachment.

6. The acoustically treated component of claim 1, wherein the structural fitting has at least two pockets and each pocket is installed with a respective non-structural acoustic treatment member, and wherein the cover is attached over both non-structural acoustic treatment members.

7. The acoustically treated component of claim 1, further comprising:
   a first structural rib extending from the second surface; and
   a second structural rib extending from the second surface, wherein a pocket is defined between the first structural rib, the second structural rib, and the second surface.

8. The acoustically treated component of claim 7, wherein the structural fitting has at least two pockets and each pocket is installed with a respective non-structural acoustic treatment member, and wherein the cover is attached over both non-structural acoustic treatment members.

9. An acoustically treated component comprising:
   a structural fitting having a first surface and a second surface, wherein the first surface defines a flow path and includes a plurality of perforations passing through the structural fitting from the first surface to the second surface;
   a first structural rib extending from the second surface;
   a second structural rib extending from the second surface, wherein a pocket is defined between the first structural rib and the second structural rib;
   at least one non-structural acoustic treatment member installed within the pocket, a first end of the at least one non-structural acoustic treatment member attached to the second surface such that a cellular structure of the at least one non-structural acoustic treatment member aligns with the plurality of perforations; and
   a cover attached on a second end of the at least one non-structural acoustic treatment member such that an acoustic chamber is defined between the cover and the cellular structure and open to the flow path.

10. The acoustically treated component of claim 9, wherein the structural fitting is one of cast, machined, or additively manufactured.

11. The acoustically treated component of claim 9, wherein the structural fitting is a component of a thrust reverser of a propulsion system.

12. The acoustically treated component of claim 9, wherein the at least one non-structural acoustic treatment member is attached to the structural fitting by one of bonding or mechanical attachment.

13. The acoustically treated component of claim 9, wherein the cover is attached to the at least one non-structural acoustic treatment member by one of bonding or mechanical attachment.

14. The acoustically treated component of claim 9, wherein the structural fitting has at least two pockets and each pocket is installed with a respective non-structural acoustic treatment member, and wherein the cover is attached over both non-structural acoustic treatment members.

* * * * *